Oct. 24, 1967 T. R. BURNIGHT ET AL 3,349,303
MECHANISM FOR PRECISELY POSITIONING A MOVING
PART RELATIVE TO A COOPERATING PART
Filed March 4, 1964 2 Sheets-Sheet 2
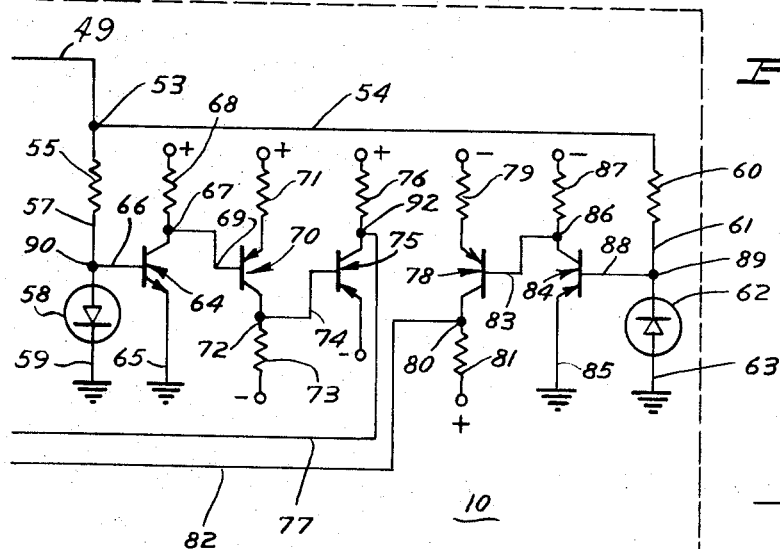
FIG. 1B
FIG. 9
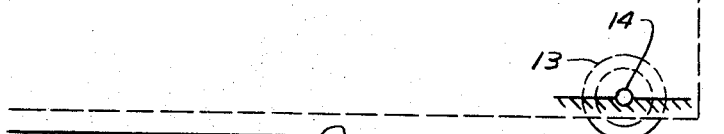
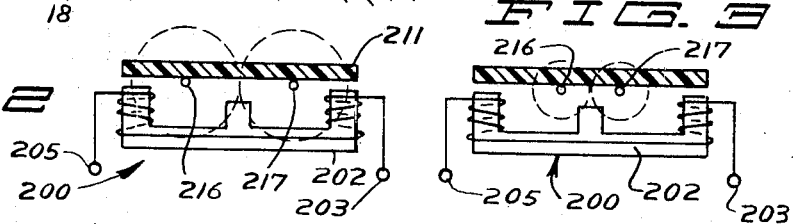
FIG. 2
FIG. 3
FIG. 4
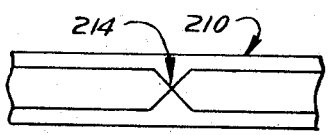
FIG. 7
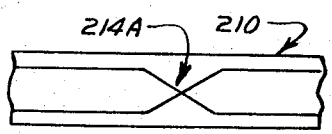
FIG. 8
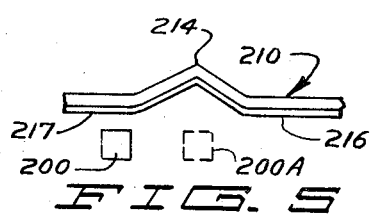
FIG. 5
FIG. 6
INVENTORS
ARTHUR R. BURCH
THOMAS R. BURNIGHT
BY
Carlson, Carlson + Sturm
ATTORNEYS

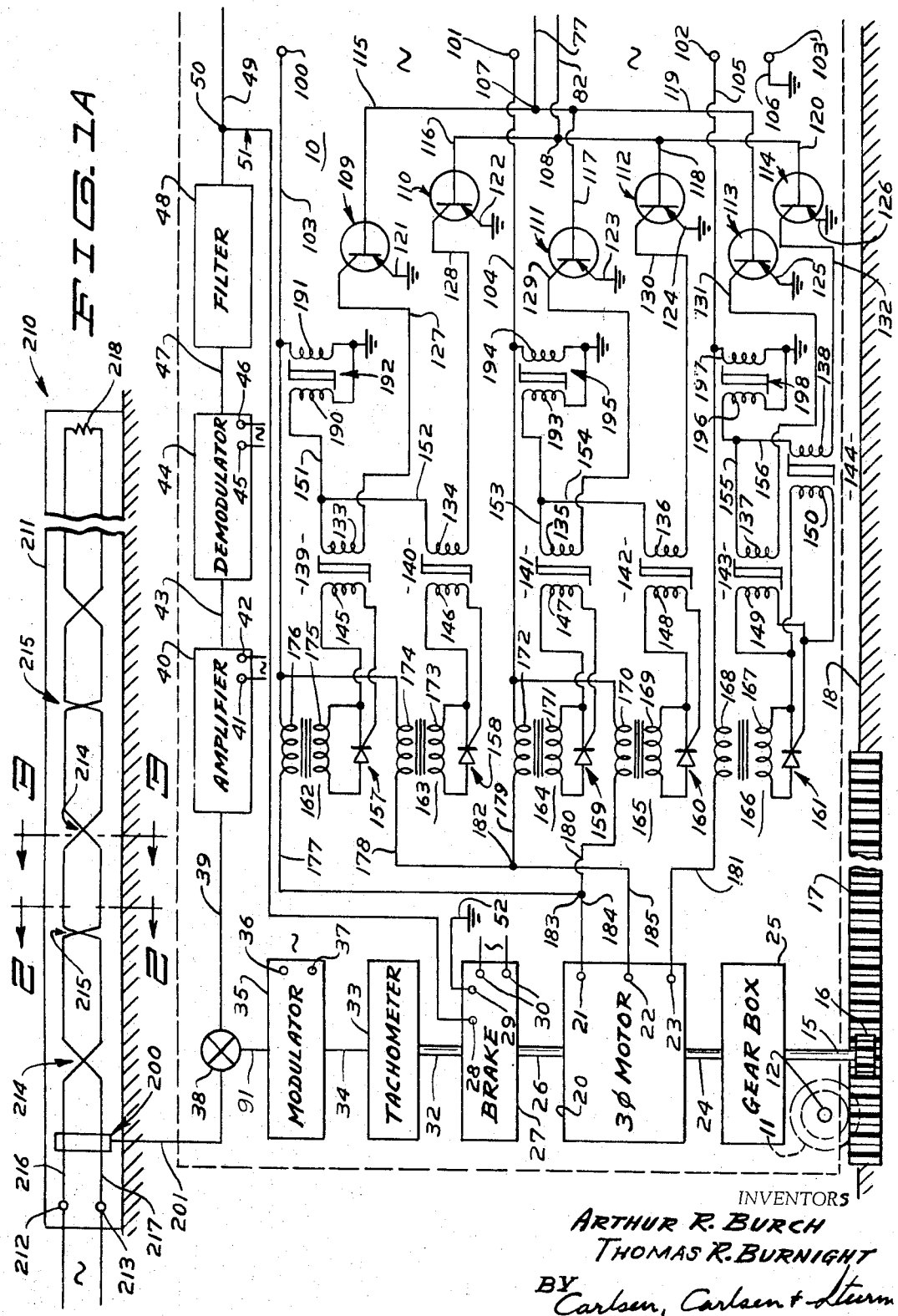

United States Patent Office 3,349,303
Patented Oct. 24, 1967

3,349,303
MECHANISM FOR PRECISELY POSITIONING A MOVING PART RELATIVE TO A COOPERATING PART
Thomas R. Burnight, Battle Creek, Mich., and Arthur R. Burch, Brooklyn Park, Minn., assignors to Hartman Metal Fabricators, Inc., Waterloo, N.Y., a corporation of New York
Filed Mar. 4, 1964, Ser. No. 349,217
9 Claims. (Cl. 318—18)

ABSTRACT OF THE DISCLOSURE

A transducer is mounted on a movable first member, for movement therewith relative to a second member, and in close proximity to a pair of conductors, which extend in the general direction of movement of the first member, and which cross one another at spaced intervals, called null points. When alternating current flows in the conductors, it creates a magnetic field which generates in the moving transducer a signal which controls the drive to the first member. By selecting a particular null point as the point for stoppage of the first member, as the transducer approaches this selected null, the magnitude of the generated signal diminishes, slowing down the drive. When the signal magnitude is zero, the drive stops. Should the movable member pass the selected null the phase of the signal reverses, reversing the drive and the movable member returns to the null.

This invention relates generally to positioning apparatus and is more particularly related to servo mechanisms for rapidly and precisely positioning one object with respect to another in a predetermined manner.

In one application of our invention, a large movable carriage may be rapidly and accurately positioned at predetermined location. For example, an elevator may be positioned at the various desired floor levels in a building or the carriage on a large machine, such as a lathe, may be rapidly and accurately moved between various predetermined positions as may be required in the machining of large objects.

Our invention is easily adapted to be utilized in applications requiring open or closed loop servo mechanism operation and, as will be seen from a consideration of the description and operation of a preferred embodiment of our invention, an on-off type of servo mechanism may be utilized to provide the above described operation.

Briefly our invention consists of a source of signal comprised of a pair of conductors mounted in substantially parallel relationship on an elongated mounting therefor and the conductors are positioned so as to intersect at predetermined locations along the elongated mounting so that two types of intersections which may be designated as stable and unstable nulls are provided. There is also provided a means for sensing the phase and magnitude of a magnetic field set up by an alternating current which is applied to the two conductors on the mounting. The mounting for the conductors is mounted on one object and the means for sensing the phase and magnitude of the magnetic field in proximity to the conductors is mounted on another object and means are provided to effect relative movement between the objects. The means for effecting the relative movement between the objects may be comprised of a suitable servo mechanism which is connected to and adapted to respond to the output of the means for sensing the magnetic field in proximity of the source of signal. As will become apparent from the description below, the phase of the magnetic field existing in proximity to the conductors reverses and is opposite on either side of the point of intersection of the conductors, or stable null, and likewise is so on either side of the unstable null intersections of the conductors. The servo mechanism is operative to provide movement between the two objects so that their relative positions will place the means for sensing the magnetic field in proximity to the conductors at the center of the intersection between the two conductors.

It is therefore an object of our invention to provide an improved positioning apparatus for accurately positioning one object with respect to another.

Another object of our invention is to provide an improved positioning apparatus which attains positioning of one object with respect to another in a rapid manner.

A further object of our invention is to provide an improved servo mechanism for positioning ponderomotive apparatus at predetermined locations in a rapid and precise manner.

Other objects and advantages of our invention will become apparent from a consideration of the appended specification, claims and drawings in which—

FIGS 1A and 1B illustrate in schematic and diagrammatic form an operative embodiment of positioning apparatus utilizing the principles of our invention;

FIGS. 2, 3 and 4 illustrate one form of a transducer which may be used with our invention and which is shown in its relationship to a portion of the apparatus shown in FIGS. 1A and 1B and graphically illustrate the relative magnitudes of a signal output;

FIGS. 5 and 6 illustrate one modification of a portion of FIG. 1A; and

FIGS. 7, 8 and 9 illustrate still another modification of a portion of FIG. 1A.

Referring now to FIGS. 1A and 1B of the drawings, there is shown a movable carriage 10 which is adapted to be driven by suitable drive means mounted thereon to one or more of a plurality of positions with respect to a stationary surface 18 through the use of a suitable pinion driving gear means 16, operatively connected to the driving means on the carriage, which cooperates with a stationarily mounted rack 17 to positions determined by a signal source indicated generally by reference numeral 210 which is shown in the illustrated embodiment as being stationarily positioned relative to carriage 10.

As may be seen on the drawings, a pair of wheels 11 and 13 are rotatably mounted on axle members 12 and 14 at the left and right hand ends respectively of the carriage, for movement thereof along a surface 18. A rack member 17 adapted to cooperate with a pinion gear 16 is also stationarily mounted on and with respect to surface 18. Carriage 10 also includes suitable drive means for rotating pinion 16, control circuitry therefor and a transducer which is responsive to stationarily positioned souce of signal 210 in a manner to be described below. The driving system for pinion gear 16 is comprised of a three-phase motor 20 having input terminals 21, 22 and 23 and output shafts 24 and 26. Output shaft 24 is connected to pinion gear 16 to drive the same through suitable gear box 25 and shaft member 15. Output shaft 26 is connected to a suitable tachometer 33 which is adapted to provide a direct current potential output proportional to the speed of rotation of motor 20, through a brake member 27 and shaft member 32. Brake member 27 includes a pair of terminals 30 adapted for connection to a suitable source of alternating current (not shown) and a pair of input terminals 28 and 29 for controlling the operation of brake 27 which are connected to a suitable source of control signal therefor. Terminal 29 is connected to ground through conductor 52 and terminal 28 is energized in a manner to be described below in connection with the control circuitry of the illustrated embodiment. The output of tachometer 33 is applied to a differential summing means 38 through conductor 34, a modulator 35 having a pair of terminals 36 and 37 adapted for connection to a suitable source of alternating current (not shown) and conductor 91. Differential summing means 38 is also connected to the output of a suitable transducer 200, stationarily mounted on carriage 10 for movement therewith, through conductor 201.

The output of differential summing device 38 is in turn connected to amplifier 40 through conductor 39. Amplifier 40 includes a pair of terminals 41 and 42 adapted for connection to a suitable source of electrical energy. The output of amplifier 40 is connected to demodulator 44 through conductor 43. Demodulator 44 includes a pair of terminals 45 and 46 adapted for connection to a suitable source of alternating current energy. The output of demodulator 44 is connected to filter 48 through conductor 47 and a unidirectional potential of variable magnitude and polarity appears at terminal 50 connected to the output of filter 48. Terminal 50 is connected to brake 27 through conductor 51 for energizing the same to release shaft 26 whenever the potential at terminal 50 exceeds a predetermined magnitude determined by the characteristics of brake 27.

A polarity responsive preamplifier and switching circuit is shown enclosed within the dotted outline of carriage 10 on FIG. 1B and includes an input terminal 53 connected to terminal 50 on filter 48 through conductor 49 and a pair of output conductors 77 and 82, one of which will be energized dependent upon the polarity of the unidirectional potential appearing at input terminal 53. Input terminal 53 is connected to ground through resistor 55, conductor 57, terminal 90, control rectifier 58 and conductor 59 and through a parallel path comprised of conductor 54, resistor 60, conductor 61, terminal 89, control rectifier 62 and conductor 63. Rectifiers 58 and 62 may be for example, tunnel diodes, and are oppositely poled for purposes to be explained below.

The right side of the preamplifier and switching means includes a pair of current controlling devices shown in the form of transistors 78 and 84 connected intermediate terminal 89 and conductor 82. Transistor 84 is shown with its base electrode connected to terminal 89 through conductor 88, its emitter electrode connected to ground through conductor 85 and its collector electrode connected to a source of negative potential (not shown) through terminal 86 and resistor 87. Transistor 78 is shown with its base electrode connected to terminal 86 through conductor 83, its emitter electrode connected to a source of negative potential through resistor 79 and its collector electrode connected to a source of positive potential through terminal 80 and resistor 81. Conductor 82 is connected to terminal 80 on the collector electrode of transistor 78.

The left side of the preamplifying and switching means includes a plurality of transistors 64, 70 and 75. Transistor 64 is shown with its base connected to terminal 90 through conductor 66, its emitter electrode connected to ground through conductor 65 and its collector electrode connected to a source of positive potential through terminal 67 and resistor 68. Transistor 70 is shown with its base electrode connected to terminal 67 through conductor 69, its emitter terminal connected to a source of positive potentials through resistor 71 and its collector electrode connected to a source of negative potential through terminal 72 and resistor 73. Transistor 75 is shown with its base electrode connected to terminal 72 through conductor 74, its emitter electrode connected to a source of negative potential and its collector electrode connected to a source of positive potential through terminal 92 and resistor 76. Terminal 92 on the collector electrode of transistor 75 is connected to output conductor 77. It may therefore be noted that one or the other of output conductors 77 and 82 connected to terminals 107 and 108 respectively, will be energized in accordance with the polarity of the signal output present at terminal 50 on filter 48.

Motor 20 is shown as a three-phase motor which may, for the purposes of this illustration, be considered as being connected in a Y configuration and having three input terminals 21, 22 and 23 which may be connected to a suitable source of three-phase electrical energy to provide reversible operation of the motor. In order to provide reversible operation of motor 20, terminal 21 is connected to supply terminals 100 and 101 through conductor 184, terminal 183 and a parallel path comprising conductor 177, primary winding 176 on transformer 162 and conductor 103 connected to input terminal 100 and conductor 180 and primary winding 170 on transformer 165 and conductor 104 connected to input terminal 101. In a similar manner, terminal 22 on motor 20 is connected to input terminals 100 and 101 through conductor 185 and terminal 182 and the parallel paths comprised of conductor 178 primary winding 174 on transformer 163 and conductor 103 connected to input terminal 100 and conductor 179 primary winding 172 on transformer 164 and conductor 104 connected to input terminal 101. Input terminal 23 on motor 20 is connected to a further input terminal 102 through conductor 181, primary winding 168 on transformer 166 and conductor 105. A fourth input supply terminal 103' is shown connected to ground through conductor 106.

Each of the transformers 162, 163, 164, 165 and 166 connected intermediate the supply terminals and the input terminals on motor 20 includes secondary windings 175, 173, 171, 169 and 167 respectively which are in turn connected across the cathode and anode terminals of silicon controlled rectifier devices 157, 158, 159, 160 and 161 respectively. It may be noted at this point that each of the transformers connected intermediate the input supply terminals 100, 101 and 102 and the input terminals on motor 20 may present a high or low impedance to the flow of electrical energy dependent upon the impedance present in series with the respective secondary windings and when a high impedance or a substantial open circuit is present in the secondary windings, the primary windings present a high impedance to the flow of current therethrough and conversely when a low impedance is present in the secondary windings, the primary windings present a low impedance to the flow of current therethrough so that the transformers noted above may operate as fast and efficient switching devices for controlling the flow of current to motor 20. The impedance of the secondary windings may be controlled by applying a suitable pulse of energy to the gate electrode of the silicon controlled rectifiers connected therein. Therefore, each of the silicon controlled rectifiers 157, 158, 159, 160 and 161 is connected with its cathode and gate electrodes in series with the respective secondary windings 145, 146, 147, 148 and 149 on saturable core transformer means 139, 140, 141, 142 and 143. The primary windings on the last named saturable core transformers are in turn connected to be energized to provide reversing operation of motor 20 from sources of signal related to the three input supply terminals 100, 101 and 102 and to the reversible polarity signal appearing at terminal 50 on the output of filter 48.

Saturable core transformer means 192 is shown with a primary winding 191 connected to terminal 100 through conductor 103, and to ground and a secondary winding 190, which is connected intermediate ground and primary windings 133 and 134 through conductors 151 and 152 respectively. Primary windings 133 and 134 are also each connected to the collector electrode, on transistor devices 109 and 110 through conductors 127 and 128 respectively. Transistor 109 is shown having an emitter electrode connected to ground through conductor 121 and a base electrode connected to terminal 107 on output conductor 77 through conductor 115; and transistor 110 is shown having an emitter electrode connected to ground through conductor 122 and a base electrode connected to terminal 108 on conductor 82 through conductor 116.

Saturable core transformer means 195 is shown with a primary winding 194 connected intermediate terminal 101 and ground through conductor 104, and with a secondary winding 193 connected intermediate ground and primary windings 135 and 136 through conductors 153 and 154 respectively. Primary windings 135 and 136 are connected to the collector electrodes on transistors 111 and 112 through conductors 129 and 130 respectively. Transistor 111 is shown having an emitter electrode connected to ground through conductor 123 and a base electrode connected to terminal 107 through conductor 117. Transistor 112 is shown having an emitter electrode connected to ground through conductor 124 and a base electrode connected to terminal 108 through conductor 118.

Saturable core transformer 198 is shown having a primary winding 197 connected intermediate terminal 102 and ground through conductor 105, and a secondary winding 196 connected intermediate ground and primary windings 137 and 138 through conductors 155 and 156 respectively. Primary windings 137 and 138 are also connected to the collector electrode on transistors 113 and 114 through conductors 131 and 132 respectively. Transistor 113 is shown having an emitter electrode connected to ground through conductor 125 and a base electrode connected to terminal 107 through conductor 119. Transistor 114 is shown having an emitter electrode connected to ground through conductor 126 and a base electrode connected to terminal 108 through conductor 120. It may therefore be seen that, dependent upon which of the terminals 107 or 108 is energized, the transistors connected to the particular terminal energized will be rendered conductive and an output pulse may be supplied through the saturable core transformers to render silicon controlled rectifiers 157, 158, 159, 160 and 161 conductive according to a predetermined pattern to energize three-phase motor 20 for operation in one direction or the other. The pulses, being derived from the individual phase conductors, or supply terminals, are related to the potential appearing on the individual conductors at any given time and the controlled rectifiers will be gated to a conductive condition during a positive half-cycle to allow current to flow through a primary winding on one of the transformers associated therewith and during the negative half-cycle, the collapse of the magnetic field will supply a negative pulse of current to motor 20 along the same phase conductor to provide a full cycle of alternating current energy.

At the upper portion of FIG. 1A, a stationarily mounted source of signal 210 is shown comprised of a support member 211, which may be comprised of suitable dielectric material having suitably attached thereto a pair of conductors 216 and 217. A pair of terminals 212 and 213, adapted for connection to a suitable source of alternating current potential (not shown), are connected to the left ends of conductors 216 and 217. The right extremities of conductors 216 and 217 are interconnected by a suitable resistance means 218. At appropriate predetermined spaced intervals along the length of source of signal 210, conductors 216 and 217 intersect as indicated by reference numeral 214 for purposes to be explained below and at intervals intermediate the locations indicated by the reference numerals 214, conductors 216 and 217 intersect as indicated by reference numerals 215. Reference numerals 214 indicate a series of what may be referred to as "stable" nulls and the locations of crossing conductors indicated by reference numerals 215 may also appropriately be referred to as "unstable" nulls. According to the principles of our invention, the "stable" nulls may be utilized to accurately position carriage 10 at the point of intersection of conductors 216 and 217 and the magnitude and phase relationship of a signal from conductors 216 and 217 sensed by transducer 200 will determine the direction of movement of carriage 10 with respect to a "stable" null.

In the illustrated embodiment, carriage 10 may be positioned with respect to the point of intersection of conductors 216 and 217 at any selected one of the intersections, or "stable" null points along the lengths of source of signal 210. Various suitable means, such as counting means, for selecting which of the "stable" null points 214 is to be utilized for positioning carriage 10 in accordance therewith will occur to those skilled in the art. One such apparatus may be easily provided by adding a means for driving carriage 10 from a source of signal independent of that indicated by reference numeral 210 and counting the "stable" null positions until the area of the selected null position 214 is reached at which point, through the use of suitable means, transducer 200 is utilized to sense the potential appearing across conductors 216 and 217 to provide a signal to cause carriage 10 to be positioned at the selected predetermined null position 214.

As shown in FIGS. 2, 3 and 4, a suitable transducer, indicated generally by reference numeral 200, may be comprised of a plurality of E-shaped laminations 202 comprised of magnetizable material and a pair of coil windings positioned on the outer legs which extend in proximity to source of signal 210 and conductors 216 and 217. The coil windings may be connected in series aiding relationship as indicated on the drawings and the output appears across terminals 203 and 205. The output will be comprised of a sinusoidal potential that is in-phase or 180°-out-of-phase with the alternating current potential applied to terminals 213 and 212 on source of signal 210. In a sectional view of FIG. 2 and the left end of FIG. 4, the relative position of transducer 200 and the conductors 216 and 217 on source of signal 210 provides, through the flux linkage therebetween, an output signal of a magnitude indicated by the horizontal line. The magnitude is indicated as being a relative magnitude. In FIG. 3, which is a cross section taken along section lines 3—3 on FIG. 1A, conductors 216 and 217 are positioned closer to the center line of source of signal 210 and the center leg of the E-shaped laminations on transducer 200 and the relative magnitude of the signal, while not reversed in phase relationship with that of the signal appearing and shown on FIG. 2, is substantially less as indicated on the right hand portion of FIG. 4.

FIGS. 7 and 8 illustrate modifications of the slope of conductors 216 and 217 at the point of intersection, or "stable" null points 214 and 214A respectively to show that the rate of change of potential which may be sensed by a transducer may be modified by changing the angle of intersection. FIG. 9 shows a solid curve which may correspond to the magnitude and rate of change of potential which might be sensed by a suitable transducer such as transducer 200 for the embodiment of FIG. 7 and the dotted curve illustrates the modification in the rate of change of potential associated with reducing the angle of intersection of conductors 216 and 217.

FIGS. 5 and 6 show a still further embodiment which may be utilized to characterize or modify the shape of the curves representing the rate of change of potential as might be sensed by transducer 200 as it moves from a position indicated by the reference numeral 200 to a position at the "stable" null point as indicated by reference numeral 200A. The solid curve in FIG. 6 is like the solid curve in FIG. 9 and indicates the rate of change and shape of curve that may be obtained where source of signal 210 and conductors 216 and 217 lie in the same plane. Where the configuration shown in FIG. 5 is utilized, the shape of the curve is modified as indicated by the dotted lines on FIG. 6 and where the point of intersection 214, of conductors 216 and 217 is displaced a greater distance from the line of travel of transducer 200, the magnitude of the potential appearing at output terminals 203 and 205 of transducer 200 is modified in the manner shown.

A further modification (not shown) in the slope or rate of change of the potential at the "stable" null positions may be obtained by varying the distance between transducer 200 and the plane of source of signal 210 whereby the magnitude of the signal intermediate null positions 214 will be reduced and the slope of the magnitude, or rate of change of potential at both sides of the point of intersection 214 will be substantially reduced and the magnitude and rate of change will increase as the distance of transducer 200 from source of signal 210 is decreased. One further modification (not shown) may be provided by characterizing the shape of conductors 216 and 217 in the vicinity of the "stable" null position as, for example, utilizing a curved rather than straight line relationship.

In the above described embodiment, source of signal 210 may be comprised of a base member 211 of suitable dielectric material and conductors 216 and 217 may be attached thereto by suitable means or may be comprised of, for example, etched conductive material constructed according to current practice in the printed wiring art where suitable insulation is provided at the points of intersection at "stable" null positions and "unstable" null positions. Brake 27 may be of the class commonly available which when de-energized effects a braking force on a shaft to which it is connected and when energized with a predetermined current, will release the braking force to allow free movement of, for example, motor 20. Tachometer 33 may be any one of a number of commercially available devices adapted to provide a substantially linear direct current potential output in response to variations in speed of a shaft to which it is connected. Modulator 35 and demodulator 44 may be comprised of circuits well known to those skilled in the art as long as the phase relationship between the alternating current potential energization applied to terminals 36 and 37 and terminals 45 and 46 respectively is observed. The several transistors and silicon controlled rectifiers utilized in the illustrative embodiment may be of any good quality commercially available devices which are capable of handling the current and voltages required. The values of the other components, such as resistors, filters, transformers and others may easily be determined by those skilled in the art to which this invention pertains upon becoming familiar with the principles of our invention and to a great extent are dependent upon the particular use to which our invention may be applied. Diodes 58 and 62 are preferably of the tunnel diode type which exhibit a characteristic of having a negative resistance characteristic namely that of having a low resistance with a relatively low magnitude of applied potential and gradually increasing up to a predetermined level of applied potential and thereafter rapidly increasing to a large value of resistance for further increases in applied potential.

*Operation*

In operation, terminals 100, 101, 102 and 103' are energized from a suitable source of three-phase alternating current energy; input terminals 212 and 213 on signal source 210, terminals 45 and 46 on demodulator 44 and terminals 36 and 37 on modulator 35, connected to tachometer 33, are energized from a suitable source of alternating current potential and particular attention is directed toward maintaining a predetermined phase relationship whereby differential summation of the output of modulator 35 and the output of transducer 200 obtained from source of signal 210 is maintained. For the purposes of illustration, it will be assumed that carriage 10 is to be positioned in accordance with the intersection of conductors 216 and 217 indicated by the reference numeral 214 at the left hand end of source of signal 210 on the top of FIG. 1A. As may now be apparent, the position shown on the drawing will result in a large signal of one phase applied to amplifier 40, demodulator 44 and the output of filter 48 will be a direct current potential of one polarity and of substantial magnitude. It will be assumed that this polarity is positive with respect to ground. At this time, the signal applied to brake 27 from terminal 50 through conductor 51 will serve to energize brake 27 to release shafts 26 and 32 for rotation. The potential across control rectifier 58 will increase to a point at which the voltage drop across the same becomes quite large which will cause transistor 64 to become conductive, transistor 70 to become non-conductive and transistor 75 to become conductive whereby the potential at its collector rises to a substantial positive value which in turn is applied through conductor 77 to terminal 107 to render transistors 109, 111 and 113 conductive when a potential is applied across their respective collector and emitter electrodes. The relationship of transistors 109, 111 and 113 will result in conduction of a three phase alternating current from terminals 100, 101 and 102 to terminals 21, 22 and 23 respectively on motor 20. This conduction will occur in the order stated as will be apparent from a consideration of the drawing as pulses of energy serve to gate silicon controlled rectifiers 157, 159 and 161 to a conductive state to allow current to pass from input terminals 100, 101 and 102 respectively and consecutively in the order of which the phase rotation of the source of three-phase alternating current energy is operative.

Three-phase motor 20 will operate through gear box 25 to rotate pinion gear 16 in a direction to drive carriage 10 toward the right end of the drawing and toward the selected indicated null position 214. As transducer 200 and carriage 10 approach the point at which conductors 216 and 217 enter the intersection in proximity to "stable" null position 214, the signal output from tachometer 33 as modulated by modulator 35 will tend to become larger than that sensed across conductors 216 and 217 by transducer 200 and motor 20 will momentarily be de-energized or even reversed to tend to reduce the speed of carriage 10 toward the right side of the drawing. As the speed is gradually reduced, the signal magnitude provided by transducer 200, being of the same phase relationship, will again cause the above described operation and motor 20 will be energized to continue to drive carriage 10 toward the right and such alternate energization and de-energization, or on-off operation, will occur until carriage 10 reaches the "stable" null position, or point of intersection of conductors 216 and 217.

As noted above, the intersection of conductors 216 and 217 may be suitably characterized to provide sufficient anticipation to tend to prevent overshoot of carriage 10 past the point of intersection of conductors 216 and 217 as it approaches the desired "stable" null position. However, should this overshoot occur, the signal sensed by transducer 200 as it passes toward the right of the intersection, or "stable" null position under consideration, the phase of the signal will be reversed and the output of filter 48 will reverse in polarity which will result in controlled rectifier 62 increasing to a substantially large value of resistance which will cause a potential to appear at the base of transistor 84 to render it conductive and thereby render transistor 78 non-conductive whereby the potential at terminal 80 will rise to a potential that is positive with respect to ground. This potential will appear at terminal 108 through conductor 82 and thereby transistors 110, 112 and 114 will be rendered conductive when suitably energized from the respective transformer windings to which they are connected. This will result in suitable pulses being applied at suitable times in synchronism with the relative magnitude of the potential appearing at terminals 100, 101 and 102 whereby silicon controlled rectifiers 158, 160 and 161 will be rendered conductive to thereby reverse the sequence of voltages applied to the input terminals 21, 22 and 23 of motor means 20 to thereby reverse the operation thereof. At the same time, the output of tachometer 33 will be reversed in polarity and operation will ensue whereby carriage 10 is driven back toward the left to the desired "stable" null position corresponding to the intersection of conductors 216 and 217 at the upper left hand of FIG. 1A.

It is understood that suitable modifications may be made in the structure as disclosed, provided such modifications come within the spirit and scope of the appended claims. Having now therefore fully illustrated and described our invention, what we claim to be new and desire to protect by Letters Patent is:

1. Positioning apparatus comprising in combination;
signal means having the characteristic of varying phase and magnitude with incremental distance from at least one stable null position thereon;
further means, said signal means and said further means being movable relative to each other;
motor means operatively connected to one of said means for providing movement of one of said means relative to the other said means;
control means, including means responsive to said signal means for reversibly energizing said motor means to position said signal means and said further means relative to one another whereby said means responsive to said signal means is positioned at said stable null position, said signal means comprising a pair of conductors having intersections at each of the stable null positions.

2. In positioning apparatus, the combination comprising;
a source of signal of reversible phase and variable magnitude, said source of signal including a pair of conductors adapted to be energized with alternating current electrical energy, said conductors having intersections therebetween at stable and unstable null positions;
transducer means responsive to the phase and magnitude of the current in said conductors, said means providing an output, across terminals thereof, proportional to the phase and magnitude of the current in said conductors;
means connected intermediate said source of signal and said transducer means operative to produce relative movement therebetween; and
control means connected to said transducer means and to said last named means for positioning said transducer and said source of signal at said stable null positions.

3. Positioning apparatus for positioning one of two members precisely relative to the other, comprising
reversible drive means for moving said one member relative to the other,
means for generating a signal during the movement of said one member, and
signal-responsive control means connected to said drive means and operative to cause said drive means to effect movement of said one member in one direction at a rate corresponding to the magnitude of said signal, and in a direction determined by the phase of said signal,
said generating means comprising electric circuit means mounted on each of said members,
one of said circuit means comprising a transducer connected to said control means, and
the other of said circuit means comprising means for creating a reversible magnetic field of variable intensity for inducing a signal of reversible phase and varying magnitude in said transducer upon movement of said one member.

4. Positioning apparatus as defined in claim 3, including means for causing the magnitude of said signal to decrease toward zero as said one member moves toward a predetermined position relative to said other member, and
means for causing the phase of said signal to reverse as said one member passes through said predetermined position.

5. Positioning apparatus as defined in claim 3, wherein said other circuit means comprises a pair of intersecting conductors.

6. Positioning apparatus as defined in claim 5, wherein said transducer is mounted on said one member for movement therewith in opposite directions along a predetermined path,
said conductors are mounted on said other member to extend parallel to one another and to said path for major portions of their lengths, and to intersect one another at spaced intervals along their lengths, and
said conductors are connected to an alternating current power source independent from said one circuit means.

7. Positioning apparatus as defined in claim 3, wherein said other circuit means comprises a pair of conductors mounted on said other member and intersecting one another at a plurality of points spaced from one another in the direction of movement of said one member, and
said transducer is mounted on said one member for movement therewith, said conductors being operative as said transducer approaches a preselected one of said points to induce said signal in said transducer.

8. Positioning means as defined in claim 7, wherein said drive means includes a reversible electric motor, and
said control means includes means for stopping said motor when said transducer is in its nearest position to said preselected point, and
means for reversing said motor, when said transducer passes beyond the last-named position.

9. Positioning apparatus as defined in claim 3, wherein said other circuit means comprises
a pair of conductors monuted on said other member and adapted to be connected to a source of alternating current, said conductors intersect one another at intervals to define a plurality of stable and unstable null positions, respectively, and
said transducer is fixedly mounted on said one member and operative upon the movement of said one member to produce a signal corresponding to the direction and intensity of the magnetic field created by the current in said conductors,
said control means being responsive to the said signal to cause said drive means to position said one member so that said transducer is opposite a pre-selected one of said stable null positions.

References Cited

UNITED STATES PATENTS

| | | | |
|---|---|---|---|
| 2,799,835 | 7/1957 | Tripp et al. | 318—20.730 |
| 2,866,946 | 12/1958 | Tripp | 318—20.730 |
| 2,915,721 | 12/1959 | Farrand et al. | 318—20.730 |
| 2,992,374 | 7/1961 | Grace | 318—20.730 |
| 3,068,386 | 12/1962 | Jaeger et al. | 318—20.720 |
| 3,202,948 | 8/1965 | Farrand | 336—115 |
| 3,249,854 | 5/1966 | Nevius | 336—129 XR |

BENJAMIN DOBECK, *Primary Examiner.*